(12) United States Patent  
Itoh et al.

(10) Patent No.: US 6,337,035 B1
(45) Date of Patent: Jan. 8, 2002

(54) PHOSPHOR AND METHOD FOR PRODUCING SAME

(75) Inventors: Shigeo Itoh; Hitoshi Toki, both of Mobara (JP)

(73) Assignee: Futaba Denshi Kogyo K.K., Mobara (JP)

(*) Notice: Subject to any disclaimer, the term of this patent is extended or adjusted under 35 U.S.C. 154(b) by 0 days.

(21) Appl. No.: 09/252,980

(22) Filed: Feb. 19, 1999

(30) Foreign Application Priority Data

Mar. 25, 1998 (JP) .......................................... 10-077823

(51) Int. Cl.$^7$ .............................................. C09K 11/00
(52) U.S. Cl. ................... 252/301.4 R; 428/403; 438/63; 117/84; 427/157; 427/215; 427/255.34; 427/255.38; 427/255.394

(58) Field of Search ................... 252/301.4 R; 428/403; 438/63; 117/84; 427/157, 215, 255.34, 255.38, 255.394

(56) References Cited

U.S. PATENT DOCUMENTS 5,792,509 A * 8/1998 Lin et al. ....................... 427/64
6,113,807 A * 9/2000 Yamaura et al. ...... 252/301.4 R
6,171,650 B1 * 1/2001 Gingerich et al. .......... 427/215

* cited by examiner

*Primary Examiner*—C. Melissa Koslow
(74) *Attorney, Agent, or Firm*—Breiner & Breiner, L.L.C.

(57) ABSTRACT

A phosphor is prepared by depositing a compound semiconductor of Groups III–V in the form of fine particles or a thin film on a surface of a carrier particle by hetero-epitaxial growth. Thus, the phosphor increased in quality is obtained with satisfactory reproducibility.

11 Claims, 1 Drawing Sheet

PHOSPHOR AND METHOD FOR PRODUCING SAME

BACKGROUND OF THE INVENTION

This invention relates to a phosphor and a method for producing the same.

It is known in the art that a GaN monocrystal exhibits a blue or green luminous color increased in luminance when it is used for an LED, an LD or the like. In the past, excitation of the material by electron beams for luminescence was attempted. However, the prior art fails to practically realize techniques of forming GaN into a phosphor in the form of a powder.

A failure in realizing practical production of such a powdery GaN phosphor which emit light due to excitation by electron beams is due to the fact that it is highly difficult to nitride the GaN phosphor unlike other phosphors. More particularly, the GaN material is reduced in difference between a nitriding temperature thereof (900 to 1050° C.) and a temperature at which decomposition thereof is started, so that heating of the material or phosphor under normal conditions causes nitriding of the phosphor and decomposition thereof to tend to be concurrently carried out, resulting in a lot of defects occurring in the phosphor. Such defects deteriorate a light emitting or luminous mechanism of the phosphor, to thereby fail to permit the phosphor to exhibit satisfactory luminance.

Synthesis of GaN used for an LED or the like is normally carried out in a manner to instantaneously cool GaN concurrently with formation of GaN by a reaction of starting materials, to thereby deposit it on a sapphire substrate. This is a reaction under thermal non-equilibrium conditions, so that only synthesis of GaN by nitriding is proceeded while preventing decomposition of the material produced. However, a phosphor used for a luminous section of a fluorescent display device must be formed into a display pattern of any desired configuration, so that the phosphor is required to take the form of a powder. For example, any conventional pattern formation techniques such as printing, slurry techniques, deposition, precipitation or the like are carried out using a phosphor in the form of a powder.

SUMMARY OF THE INVENTION

The present invention has been made in view of the foregoing situation of the prior art.

Accordingly, it is an object of the present invention to provide a phosphor in the form of a powder which is formed on at least a part of a surface thereof with a compound semiconductor made of elements of Groups IIIA–VA of the periodic table (hereinafter also referred to as "compound semiconductor of Groups IIIA–VA") in the form of either fine particles or a thin film, as represented by a GaN phosphor.

It is another object of the present invention to provide a method for producing a phosphor which is capable of providing such a phosphor as described above.

In accordance with one aspect of the present invention a phosphor is provided. The phosphor includes a carrier particle and a compound semiconductor deposited in the form of fine particles or a thin film on a surface of the carrier particle by hetero-epitaxial growth. The compound semiconductor is made of elements of Groups IIIA–VA of the periodic table.

In a preferred embodiment of the present invention, the phosphor is excited by ultraviolet rays or electron beams.

In a preferred embodiment of the present invention, each of the fine particles or the thin film has a dopant added thereto.

In a preferred embodiment of the present invention, the dopant comprises at least one element selected from the group consisting of Zn, Si and Mg.

In a preferred embodiment of the present invention, the compound semiconductor is selected from the group consisting of $Ga_xIn_{1-x}N$ ($0<x\leq1$) and $Ga_xIn_{1-x}P$ ($0<x\leq1$).

In a preferred embodiment of the present invention, the carrier particle is made of a material selected from the group consisting of nitrides and oxides of Si and Al, and a mixture thereof.

In a preferred embodiment of the present invention, the carrier particle is made of a material selected from the group consisting of AlN and $Al_2O_3$.

In a preferred embodiment of the present invention, the carrier particle has a particle diameter within a range between 0.01 $\mu$m and 2 $\mu$m.

In accordance with another aspect of the present invention, a method for producing a phosphor is provided. The method includes the step of subjecting fine particles of a compound semiconductor or a thin film thereof to heteroepitaxial growth on a surface of a carrier particle, wherein the compound semiconductor is made of elements of Groups IIIA–VA of the periodic table.

In a preferred embodiment of the present invention, the method further includes the step of imparting energy to the carrier particle while or after introducing organic metal gas into a closed space in which the carrier particle is received, to thereby form the thin film on the surface of the carrier particle by chemical vapor deposition.

In a preferred embodiment of the present invention, ammonia gas and dopant-ingredient containing gas are introduced into the closed space together with the organic metal gas.

In a preferred embodiment of the present invention, the organic metal gas is selected from the group consisting of TMGa and TMIn, the dopant-ingredient containing gas is selected from the group consisting of DMZn, DEZn and SiH4, and the carrier particle is selected from the group consisting of AlN and $Al_2O_3$.

In a preferred embodiment of the present invention the carrier particle is AlN and is removed by subjecting the carrier particle to a wet or dry etching treatment after formation of the fine particles or thin film, resulting in only the compound semiconductor being obtained.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein the single FIGURE is a schematic sectional view showing an apparatus for producing a phosphor which may be used in practicing of the present invention by way of example.

DETAILED DESCRIPTION OF THE PREFERRED EMBODIMENT

Figure 1:
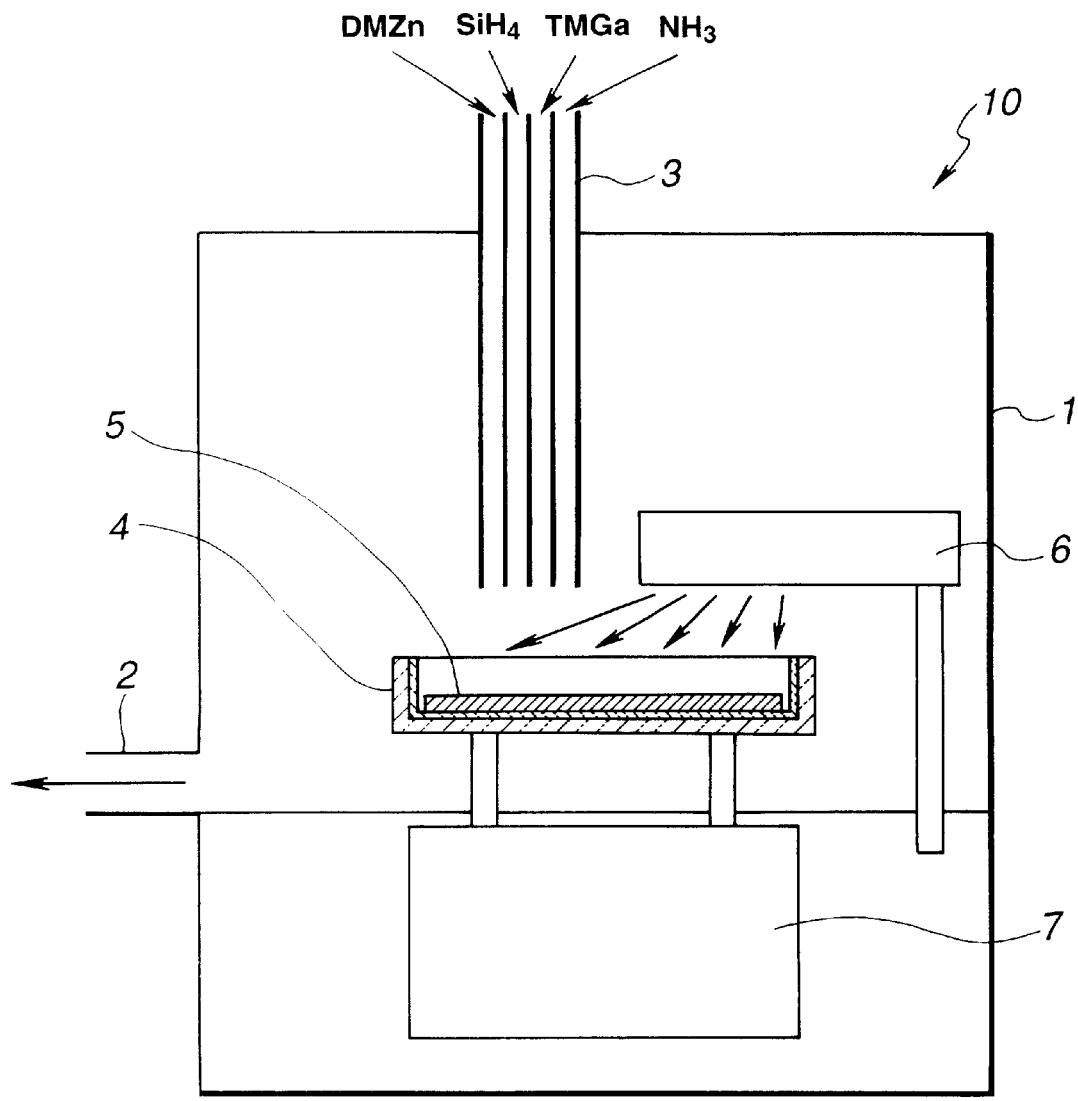

Now, the present invention will be described hereinafter with reference to the single FIGURE.

In an embodiment of the present invention, a phosphor of the present invention includes a carrier particle acting as a nucleus or core of the phosphor and a compound semiconductor deposited in the form of fine particles or a thin film on a surface of the carrier particle by hetero-epitaxial growth. The compound semiconductor is made of elements of Groups IIIA–VA of the periodic table. The carrier particle is made into a particle diameter within a predetermined range and so as to exhibit satisfactory crystallizability. The carrier particle may be made of AlN or $Al_2O_3$ in view of lattice alignment. Also, the carrier particle is required to have a particle diameter smaller than that of a phosphor conventionally used. For example, the carrier particle may be suitably formed into a particle diameter of 0.01 to 2 μm. The elements of Group IIIA of the periodic table include B, Al, Ga, In and the like. The elements of Group VA include N, P, Sb, Bi and the like. Thus, the compound semiconductor of Groups IIIA–VA may be made of a material selected from any combination of the above-described elements depending on various conditions. The compound semiconductors of Groups IIIA–VA include $Ga_xIn_{1-x}N$ ($0<x\leq1$) and $Ga_xIn_{1-x}P$ ($0<x\leq1$) by way of example. More specifically, the compound semiconductors include, for example, GaN, GaInN and the like. The compound semiconductor may have Zn Si, Mg or the like added thereto so as to act as a dopant.

The present invention also provides a method for producing the above-described phosphor. In an embodiment of the method of the present invention, chemical vapor deposition (CVD) is used, which permits the above-described compound semiconductor to be deposited in the form of fine particles or a thin film on a surface of the above-described carrier particle by hetero-epitaxial growth, resulting in the above-described phosphor which has a particle diameter within a predetermined range and exhibits satisfactory crystallizability being produced.

CVD is adapted to permit crystal growth of a thin semiconductor film. In particular, when it is used to carry out growth of a thin semiconductor film on a monocrystal, it permits epitaxial growth of the film. It uses starting materials in the form of gas and functions to deposit a thin film utilizing a chemical reaction, unlike other crystal growth. This permits a stoichiometric ratio of the thin compound film to be readily maintained. Energy required for the reaction may be provided by any suitable energy means such as resistance heating, radio-frequency heating, IR heating, plasma, ECR plasma, light, laser or the like. Control of a temperature of the starting gas materials leads to control of a saturated vapor pressure and adjustment of a flow rate of the starting gas materials permits a feed rate of the materials to be varied as desired, so that control of a composition of the starting gas materials may be precisely controlled. Use of the starting materials in the form of gas permits the fine particles or thin film to be uniformly deposited in a surface of the carrier particle, to thereby contribute to mass-production of the phosphor.

More particularly, the above-described carrier particle is placed in a closed reactor and then energy is applied or imparted to the reactor while or after introducing organic metal gas, ammonia gas and any optional dopant-ingredient containing gas, so that the thin film described above may be deposited on the surface of the carrier particle by CVD. TMGa or TMIn may be used as the organic metal gas by way of example. The dopant-ingredient containing gas may be, for example, DMZn, DEZn, $SiH_4$ or the like.

When AlN is used for the carrier particle in the method for producing the phosphor according to the present invention, the carrier particle may be treated with an acid for removal thereof after formation of the thin film, so that only the compound semiconductor of Groups IIIA–VA may be provided.

As can be seen from the foregoing, in the present invention, the phosphor is prepared by depositing the compound semiconductor of Groups IIIA–VA in the form of fine particles or a thin film on the surface of the carrier particle by hetero-epitaxial growth. Thus, the present invention provides the phosphor increased in quality while ensuring satisfactory reproducibility. For example, crystal growth of GaN on a surface of a particle of a seed crystal which is capable of being readily lattice-aligned with GaN provides a GaN phosphor with increased reproducibility.

Also, when the seed crystal acting as the carrier particle is formed into a uniform particle distribution, a particle-like phosphor having a uniform particle diameter can be obtained by suitably setting conditions for crystal growth.

The invention will be understood more readily with reference to the following examples; however, these examples are intended to illustrate the invention and are not to be construed to limit the scope of the invention.

EXAMPLE 1

A phosphor producing apparatus 10 shown in the single figure was used, which is so constructed that a vacuum vessel 1 in which a closed space is defined is connected through a suction pipe 2 to a vacuum system (not shown), resulting in a vacuum being formed in the closed space. The vacuum vessel 1 has a plurality of inlet pipes 3 connected thereto to introduce starting gas materials thereinto. The vacuum vessel 1 is provided therein with a container 4 in which the carrier particles are put. The container 4 is made of quartz glass increased in heat insulation. The container 4 has a silicon wafer 5 arranged on a bottom thereof, resulting in exhibiting increased heat absorption characteristics. The apparatus 10 also includes a lamp 6 arranged above the container 4 so as to act as a heating means, so that the carrier particles in the container 4 may be heated to a desired temperature. Alternatively, the heating means may be constructed of any one of the above-described heating techniques. The container 4 is connected to an agitator (oscillator) 7 utilizing, for example, an ultrasonic wave, to thereby agitate the carrier particles in the container 4. Alternatively, agitation may be carried out using any suitable mechanical means such as a spatula or the like.

In the phosphor producing apparatus 1 thus constructed, the agitator 7 vibrates the container 4 to agitate the carrier particles. This renders heating of the carrier particles and feeding of the starting gas materials uniform, so that the materials may be uniformly deposited on each of the carrier particles. In the example, fine particles of the semiconductor are deposited on the surface of the carrier particle while being continuously linked together thereon, to thereby form a thin film. In this case, crystal growth of the thin semiconductor film would cause coalescence or adhesion between the thin films on the carrier particles adjacent to each other, to thereby fail to provide phosphors in the form of a powder. However, the crystal growth carried out while applying vibration to the carrier particles by means of the agitator 7 eliminates such a disadvantage.

In the example, TMGa (trimethyl Ga) acting as the organic metal gas, ammonia ($NH_3$) gas, and $SiH_4$ (silane) and DMZn (dimethyl Zn) each acting as dopant-ingredient containing gas were used as the starting gas materials. For the carrier particle (powders) acting as a nucleus or core of the phosphor, AlN was used which has an average particle diameter of 1 μm. Growth was carried out while setting a temperature of the Si wafer 5 at 1020° C. by heating using a lamp.

More particularly, the growth was executed under a pressure of 40 Torr while flowing TMGa, $NH_3$ and each of the above-described materials acting as the dopant at a flow rate of 20 μmol/min, 0.08 mol/min and 0.5 μmol/min, respectively, so that GaN:Zn,Si was grown on a surface of the AlN carrier particle. Then, the carrier particle was subject to annealing at 700° C. in a nitrogen atmosphere, to thereby obtain the phosphor. PL observation of the phosphor thus obtained indicated that the phosphor emits light of a blue luminous color. Also, the phosphor was coated on an anode substrate of a fluorescent display device (VFD) and excited for luminescence under an anode voltage of 30 V. As a result, it was found that it exhibits a blue luminous color at luminance of about 500 cd/m². Also, $Ga_2O_3$ was subject to nitriding using $NH_3$ and using DMZn and $SIH_4$ as a dopant. A phosphor obtained exhibited luminance as low as about 5 cd/m².

In the example, the carrier particle is AlN. Therefore, a treatment of the carrier particle with an acid after formation of the thin film provides only the GaN:Zn,Si phosphor which is a compound semiconductor of Groups IIIA–VA. This permits the phosphor to be constituted of only a luminous element or section and reduced in diameter thereof, resulting in a luminous pattern being fine when the pattern is formed by printing or the like.

EXAMPLE 2

TMGa (trimethyl Ga) and TMIn (trimethyl In) each acting as the organic metal gas, ammonia ($NH_3$) gas, and DEZn (diethyl Zn) acting as the dopant-ingredient containing gas were used as the starting gas materials. For the carrier particle (powders) acting as a nucleus or core of the phosphor, $Al_2O_3$ was used which has an average particle diameter of 0.5 μm. Growth was carried out while setting a temperature of the Si wafer 5 at 800° C. by heating using a lamp.

More particularly, the growth was executed under a pressure of 40 Torr while flowing TMGa, TMIn, $NH_3$, NH3 and the above-described material acting as the dopant at a flow rate of 5 μmol/min, 20 μmol/min, 0.08 mol/min and 0.5 μmol/min, respectively, so that fine particles of GaInN:Zn,Si were grown on a surface of the $Al_2O_3$ carrier particle. In the example, fine particles of the semiconductor were grown independently from each other on the surface of the carrier particle without forming any thin film. Then, the carrier particle was subject to annealing at 650° C. in a nitrogen atmosphere, to thereby obtain the phosphor. PL observation of the phosphor thus obtained indicated that the phosphor emits light of a yellow luminous color. Also, the phosphor was coated on an anode substrate of a fluorescent display device (VFD) and excited for luminescence under an anode voltage of 30 V. As a result, it was found that it exhibits a yellow luminous color at luminance of about 400 cd/m². Also, $Ga_2O_3$ was subject to nitriding using $NH_3$ and using DMZn and $SIH_4$ as a dopant. A phosphor obtained exhibited luminance as low as about 8 cd/m².

EXAMPLE 3

Examples 1 and 2 were substantially repeated except that a flow rate of TMGa and TMIn was controlled, to thereby synthesize compounds of any desired composition expressed by a chemical formula $Ga_xIn_{1-x}N$ ($0<x\leq 1$). The compounds respectively exhibited various luminous colors extending from a blue luminous color to a red luminous color, as known in the art that such a solid solution is continuously varied in energy gap depending on a ratio between Ga and In, like ZnCdS.

In the present invention, the dopant is not limited to the materials described above. Mg compounds may be used for this purpose.

Also, any suitable material containing P may be substituted for $NH_3$ gas. This permits a phosphor $Ga_xIn_{1-x}P$ ($0<x\leq 1$) to be prepared using substantially the same procedure and conditions as in the examples described above.

In addition, the compound semiconductor of Groups IIIA–VA formed on the carrier particle may be suitably prepared or synthesized by selecting any suitable elements from Groups IIIA and VA of the periodic table and setting any suitable conditions depending on the elements selected. The compound semiconductor may be prepared either in the form of fine particles independent from each other or in the form of a thin film wherein the fine particles are contacted with each other or deposited in a layer-like manner.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A phosphor comprising a carrier particle coated with fine particles or a thin film of a Group IIIA–VA compound semiconductor by hetero-epitaxial growth, wherein the carrier particle is composed of a material selected from the group consisting of nitrides and oxides of Si and Al, and mixtures thereof.

2. A phosphor as defined in claim 1, wherein said phosphor is excited by ultraviolet rays or electronic beams.

3. A phosphor as defined in claim 1, wherein each of said fine particles or said thin film has a dopant added thereto.

4. A phosphor as defined in claim 3, wherein said dopant comprises at least one element selected from the group consisting of Zn, Si and Mg.

5. A phosphor as defined in claim 1, wherein said compound semiconductor is selected from the group consisting of $Ga_xIn_{1-x}N$ ($0<x\leq 1$) and $Ga_xIn_{1-x}P$ ($0<x\leq 1$).

6. A phosphor as defined in claim 1, wherein said carrier particle is made of a material selected from the group consisting of AlN and $Al_2O_3$.

7. A phosphor as defined in claim 1, wherein said carrier particle has a particle diameter within a range between 0.01 μm and 2 μm.

8. A method of producing a phosphor comprising the step of:

subjecting fine particles of a compound semiconductor or a thin film thereof to hetero-epitaxial growth on a surface of a carrier particle;

said compound semiconductor being made of elements of Groups IIIA–VA of the periodic table.

9. A method as defined in claim 8, further comprising the step of imparting energy to said carrier particle while or after introducing organic metal gas into a closed space in which said carrier particle is received, to thereby form said thin film on the surface of said carrier particle by chemical vapor deposition.

10. A method as defined in claim 9, wherein ammonia gas and dopant-ingredient containing gas are introduced into said closed space together with said organic metal gas.

11. A method as defined in claim 10, wherein said organic metal gas is selected from the group consisting of TMGa and TMIn;

said dopant-ingredient containing gas is selected from the group consisting of DMZn, DEZn and SiH4; and said carrier particle is selected from the group consisting of AlN and $Al_2O_3$.

* * * * *